Sept. 29, 1936.    C. B. STRANDGREN    2,055,951
POWER TRANSMISSION DEVICE
Original Filed Oct. 25, 1933    2 Sheets—Sheet 1
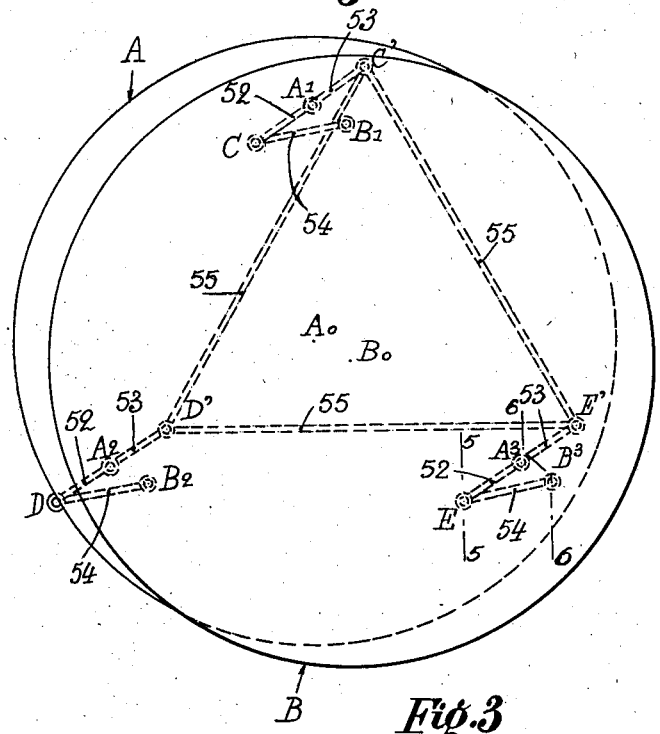
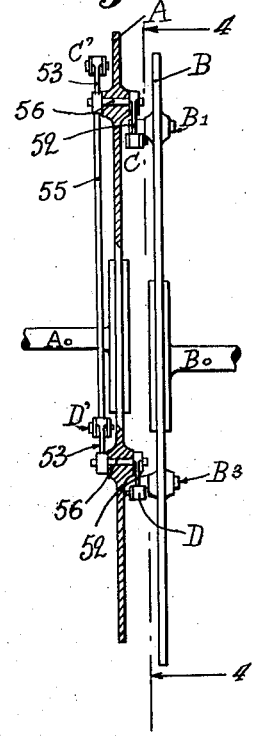
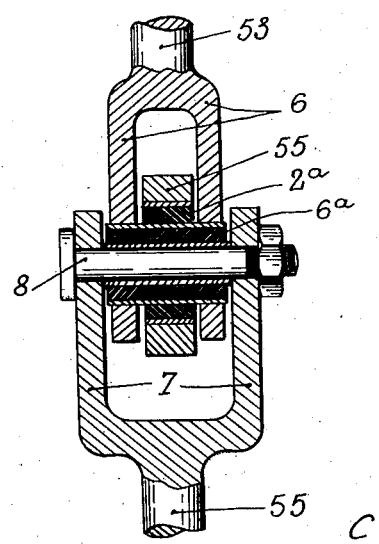
C. B. Strandgren
Inventor
By: Glascock Downing & Seebold
Attys.

Sept. 29, 1936.  C. B. STRANDGREN  2,055,951
POWER TRANSMISSION DEVICE
Original Filed Oct. 25, 1933   2 Sheets-Sheet 2

Inventor
C. B. Strandgren
By Glascock Downing & Seebold
Attorneys.

Patented Sept. 29, 1936

2,055,951

UNITED STATES PATENT OFFICE 2,055,951

POWER TRANSMISSION DEVICE

Carl Bruno Strandgren, Versailles, France

Original application October 25, 1933, Serial No. 695,188. Divided and this application May 10, 1935, Serial No. 20,858. In France November 26, 1932

1 Claim. (Cl. 64—19)

The present invention, which is a division of my copending application No. 695,188, relates to a power transmission device of the homo-kinetic type, adapted for making connection between two parallel or practically parallel shafts, and more particularly between two parallel shafts whose spacing is variable during their rotation. The said device which is in fact intended to replace the joint having two perpendicular slots, termed "Oldham joint", may be utilized especially in order to connect a vehicle wheel, mountd on springs, with its driving device (driving shaft of a motor vehicle, electric motor of an electric locomotive or the like).

The preferred use considered by the applicant consists in the connection between the shaft of a feathering paddle wheel, such as the one described in his French Patent No. 700,476 of November 20th, 1929, and the rotary device of variable eccentricity which controls the oscillation of the oscillating blades or paddles.

According to the invention the power transmission mechanism comprises two sets of pivotal links, the links of one set having the same length, being pivoted at points on the driving (or the driven) member which are situated at the apices of a regular polygon whose center is on the axis of rotation of said member and being connected together by coupling bars for holding the links of said set in parallel relation with one another, and the links of the other set having also the same length, being pivoted at points on the driven (or the driving) member situated at the apices of a regular polygon whose center is on the axis of said second member, and being each pivoted to a corresponding link of the first set.

Owing to said arrangement the device is statically and dynamically balanced and may be advantageously used when the driving and driven members are adapted to rotate at high speeds. Furthermore the system of bars for coupling and maintaining in parallel relation the links of each set is very light and not bulky and does not require any means for guiding said system of bars during the operation of the mechanism.

In the accompanying drawings, given solely by way of example:

Fig. 1 is a diagrammatic view of an apparatus according to the invention.

Fig. 2 is a side view of the apparatus shown in Fig. 1, with parts broken away.

Fig. 3 is a detail view of a joint.

Figure 4:
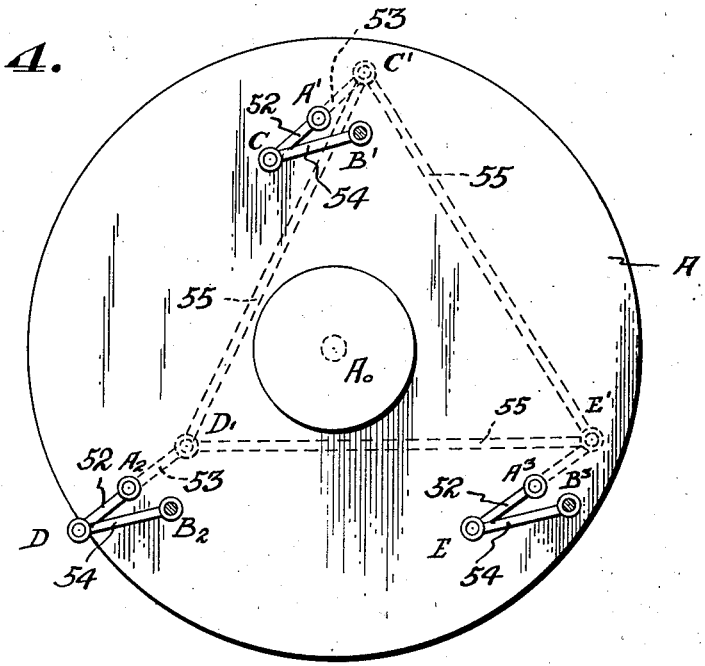
Fig. 4 is a sectional view taken along line 4—4 of Fig. 2.
Figure 5:
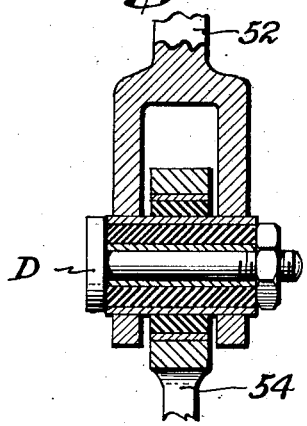
Fig. 5 is an enlarged sectional detail showing a connection between two of the link members and taken on line 5—5 of Fig. 1.
Figure 6:
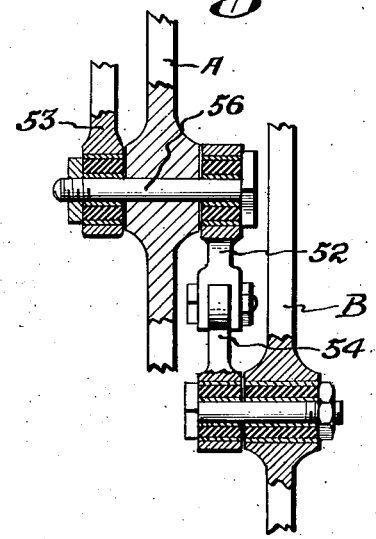
Fig. 6 is an enlarged sectional view on line 6—6 of Fig. 1 showing the connection of the driving member to the driven member.

The embodiment shown in the drawings is adapted for connection of a driving member A (for instance a disc rotating on axis $A_0$) with a driven member B (for instance a disc rotating on axis $B_0$) and comprises at least three pairs of links, connected together and with the driving member A and the driven member B in the following manner:

Three links 52 of equal length are pivoted respectively at points $A_1$, $A_2$, $A_3$ of member A upon axes 56. These points are situated at the apices of an equilateral triangle whose center is $A_0$. Three other links 54 of equal length are respectively pivoted in the same manner at points $B_1$, $B_2$, $B_3$ of member B which are situated at the apices of an equilateral triangle whose center is $B_0$ and which is equal to triangle $A_1$, $A_2$, $A_3$. The free end of each link 54 is pivoted to a corresponding link 52, at C, D, or E, so that members A and B are connected together at three points through three pairs of links 52—54. Said three pairs of links are also connected together by pivoted coupling bars 55 whose length is equal to the length of the sides of triangles $A_1$, $A_2$, $A_3$, $B_1$, $B_2$, $B_3$ in order that links 52 always remain parallel with one another. Due to said coupling bars, links 54 will also remain parallel with one another.

Preferably, each link 52 is rigid with axis 56 which extends through member A and carries, on the other side of said member, a link 53. The three links 53 are of equal length and parallel with one another, and make a determined angle with links 52, for instance an angle of 180° as shown in Fig. 2. The coupling bars 55 are pivoted at the free ends C' D' E' of links 53. Said arrangement has the advantage that the weight of links 53 and bars 55 may be so chosen as to counterbalance the weight of links 52, 54. Furthermore the coupling of four links at the same points C D E is avoided since bars 55 are pivoted at C' D' E' instead of being pivoted at C D E.

In the case in which the shafts to be connected are not exactly parallel, use may be made of a hinged joint for the links 52 or 54, the axis of the hinge being situated in the plane of the figure and perpendicular to the axis of the corresponding link.

It will be noted that in the apparatus shown in the drawings, the eccentricity of the shaft will never be annulled and this may be advantageous for certain applications. If, on the contrary, it is desired that the eccentricity may be annulled, the links 52 and 54 will be given equal lengths.

Obviously, it is possible to increase at will the number of pairs of links 52, 54 which connect the driving and the driven members. In all the cases the points $A_1$, $A_2$, $A_3$ . . ., of member A are so chosen on said member that they will be situated at the apices of a regular polygon whose center is $A_0$. In the same manner, the points $B_1$, $B_2$, $B_3$ . . ., will always be situated at the apices of another regular polygon the center of which is $B_0$ and which is equal to the first one.

Obviously, at each of the pivot points of links 52, 53, 54 and bars 55, between the pivot axis and the corresponding links, either smooth bearings, or ball or roller bearings, and preferably needle bearings (the rollers consisting of fine needles in great number) which take up a very small space, may be used. As the relative movement of the links are movements of oscillation having a limited amplitude, elastic joints of the "silentbloc" type may also be used, such joints dispensing with all lubrication and allowing to connect shafts which are not exactly parallel.

Having now described my invention what I claim as new and desire to secure by Letters Patent is:

A power transmission mechanism for connecting a driving member with a driven member rotating about substantially parallel axes of varying spacing, which comprises a first set of at least three parallel links of equal length pivoted on the driving member at points situated at the apices of a regular polygon concentric with the axis of rotation of said driving member, a second set of parallel links of equal length pivoted on the driven member at points situated at the apices of a regular polygon concentric with the axis of rotation of said driven member, the free end of each link of one set being pivoted to the free end of a corresponding link of the other set, a set of parallel arms rigidly connected with the respective links of one set, on the opposite side of the corresponding member, said arms having a common length substantially equal to that of said latter links, and said links and said arms extending in substantially opposite directions, and floating coupling means pivotally connected to the free ends of said arms.

CARL BRUNO STRANDGREN.